United States Patent
Rainisto et al.

(10) Patent No.: US 10,665,034 B2
(45) Date of Patent: May 26, 2020

(54) IMAGING SYSTEM, DISPLAY APPARATUS AND METHOD OF PRODUCING MIXED-REALITY IMAGES

(71) Applicant: Varjo Technologies Oy, Helsinki (FI)

(72) Inventors: Roope Rainisto, Helsinki (FI); Ville Timonen, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/594,228

(22) Filed: Oct. 7, 2019

(65) Prior Publication Data

US 2020/0035035 A1 Jan. 30, 2020

Related U.S. Application Data

(63) Continuation-in-part of application No. 15/898,448, filed on Feb. 17, 2018.

(51) Int. Cl.
*G06T 7/60* (2017.01)
*G06T 19/00* (2011.01)
(Continued)

(52) U.S. Cl.
CPC ............ *G06T 19/006* (2013.01); *G06F 3/012* (2013.01); *G06F 3/013* (2013.01); *G06T 3/4053* (2013.01);
(Continued)

(58) Field of Classification Search
CPC .......................... G06T 7/194; G06K 2009/4657
(Continued)

(56) References Cited

U.S. PATENT DOCUMENTS

2015/0312468 A1  10/2015  Taylor
2015/0347854 A1*  12/2015  Bare ................... G06T 19/006
345/633
(Continued)

FOREIGN PATENT DOCUMENTS

EP         2462564 B1    6/2012
EP       10736710.4 B1    4/2014
WO      2018000304 A1    1/2018

OTHER PUBLICATIONS

The International Search Report and the Written Opinion of the International Searching Authority, PCT/FI2019/050083, dated May 25, 2019.

*Primary Examiner* — Thomas J Lett
(74) *Attorney, Agent, or Firm* — Ziegler IP Law Group LLC (57) ABSTRACT

An imaging system for producing mixed-reality images for display apparatus. The imaging system includes a camera and a processor communicably coupled to the camera. The processor is configured to control the camera to capture image of real-world environment; analyze the image to identify surface that displays visual content; compare the visual content displayed in the image with reference image of the visual content to determine size, position and orientation of the surface with respect to the camera; process the reference image of the visual content to generate processed image of the visual content; and replace the visual content displayed in the image with the processed image to generate mixed-reality image, wherein resolution of the processed image is higher than resolution of the visual content displayed in the image.

20 Claims, 4 Drawing Sheets (51) Int. Cl.
*G06T 7/73* (2017.01)
*G06F 3/01* (2006.01)
*G06T 3/40* (2006.01)
*H04N 5/232* (2006.01)

(52) U.S. Cl.
CPC ................ *G06T 7/60* (2013.01); *G06T 7/74* (2017.01); *H04N 5/23299* (2018.08)

(58) Field of Classification Search
USPC ........................................................ 345/633
See application file for complete search history.

(56) References Cited

U.S. PATENT DOCUMENTS

| | | | |
|---|---|---|---|
| 2016/0035132 A1* | 2/2016 | Shuster | G06T 19/006 345/633 |
| 2016/0224657 A1 | 8/2016 | Mullins | |
| 2016/0228770 A1* | 8/2016 | Hall | A63F 13/12 |
| 2017/0358141 A1 | 12/2017 | Stafford | |

* cited by examiner

IMAGING SYSTEM, DISPLAY APPARATUS AND METHOD OF PRODUCING MIXED-REALITY IMAGES

CROSS-REFERENCE TO RELATED APPLICATIONS

This application is a continuation-in-part of U.S. patent application Ser. No. 15/898448, titled "SYSTEM AND METHOD OF ENHANCING USER'S IMMERSION IN MIXED REALITY MODE OF DISPLAY APPARATUS" and filed on Feb. 17, 2018, which is incorporated herein by reference.

TECHNICAL FIELD

The present disclosure relates generally to imaging systems; and more specifically, to imaging systems for producing mixed-reality images for display apparatuses. Moreover, the present disclosure relates to display apparatuses comprising image renderers, cameras and processors. Furthermore, the present disclosure also relates to methods of producing mixed-reality images for display apparatuses.

BACKGROUND

In the past few decades, modern technologies such as virtual reality, augmented reality, mixed reality, and the like, have made exponential advancement in the way such technologies represent simulated environments to users of specialized devices. Specifically, such simulated environments relate to fully virtual environments (namely, virtual reality environments) as well as real-world environments having virtual objects therein (namely, augmented reality environments, mixed-reality environments). Presently, the mixed-reality environments are experienced by users using dedicated mixed-reality devices such as mixed-reality headsets, mixed-reality glasses, and the like.

Typically, a given mixed-reality environment has both real-world objects and virtual objects therein. Some real-world objects display visual content thereon. The visual content displayed on a given real-world object is generally captured by cameras mounted on the mixed-reality devices. Notably, due to limitations of existing imaging technologies, in a captured image of such visual content, the visual content has lower resolution and clarity as compared to a real-world representation of the visual content. Furthermore, when the captured image is rendered via the mixed-reality devices, the resolution and clarity of the visual content degrades further due to limitations of rendering equipment of the mixed-reality devices. As a result, within the mixed-reality environment, the users are provided with poor resolution and poor clarity of visual content displayed on the real-world objects.

Moreover, the mixed-reality devices generally localize the real-world objects displaying the visual content for optimally capturing the visual content. Notably, the real-world objects are localized by determining their size and pose with respect to the cameras. Presently, the real-world objects that display the visual content are localized by way of attaching a tracker puck to the real-world objects and/or manually providing information indicative of the size and pose of the real-world objects. However, such ways of localizing the real-world objects are expensive, inconvenient and lack scalability that would be required to localize a large number of real-world objects displaying visual content. Nowadays, the users use tracked controllers and click on corners of the real-world objects to input the size and pose thereof into the mixed-reality devices. However, when said real-world objects are movable, using tracked controllers is not a feasible solution. Therefore, nowadays, another approach for localizing movable real-world objects is being employed, said approach pertaining to attachment of a trackable marker (for example, such as a Quick Response Code, an ArUco marker, and the like) onto the movable real-world objects. However, the trackable markers only allow for localization of the real-world objects and do not provide any assistance with regard to improvement of resolution and clarity of the visual content presented to the user within the mixed-reality environment.

Currently, due to degradation in resolution and clarity of visual content using conventional equipment and limitations of real-object localizing techniques, the users face difficulty in clearly viewing and understanding the visual content represented in the mixed-reality environment. Furthermore, inefficient localization of a given real-world object often provides the mixed-reality environment with a perspective that is different from a perspective of a user. Such a perspective disparity causes confusion in the mind of the user, and difficulty in understanding the visual content. Therefore, the user's experience of the mixed-reality environment deteriorates and is suboptimal.

Therefore, in light of the foregoing discussion, there exists a need to overcome the aforementioned drawbacks associated with quality of visual content rendered in mixed-reality environments and localization of real-world objects displaying the visual content.

SUMMARY

The present disclosure seeks to provide an imaging system for producing mixed-reality images for a display apparatus. The present disclosure also seeks to provide a display apparatus comprising at least one image renderer, at least one camera and a processor. The present disclosure further seeks to provide a method of producing mixed-reality images for a display apparatus. The present disclosure seeks to provide a solution to the existing problem of poor resolution and poor clarity of visual content displayed on real-world objects, when such real-world objects are viewed via mixed-reality devices. Moreover, the present disclosure seeks to provide a solution to another existing problem of suboptimal real-object localizing techniques being employed by the mixed-reality devices. An aim of the present disclosure is to provide a solution that overcomes at least partially the problems encountered in prior art, by providing an imaging system, a display apparatus and a method of producing a mixed-reality image that represents visual content displayed in a real-world environment with high resolution, whilst also optimally localizing the real-world objects displaying the visual content.

In one aspect, an embodiment of the present disclosure provides an imaging system for producing mixed-reality images for a display apparatus, the imaging system comprising at least one camera and a processor communicably coupled to the at least one camera, wherein the processor is configured to:
control the at least one camera to capture a given image of a real-world environment;
analyze the given image to identify at least one surface in the real-world environment that displays visual content;
compare the visual content displayed in the given image with a reference image of the visual content to determine a size, a position and an orientation of the at least one surface with respect to the at least one camera;

process the reference image of the visual content, based on the size, the position and the orientation of the at least one surface, to generate a processed image of the visual content; and replace the visual content displayed in the given image with the processed image of the visual content to generate a given mixed-reality image, wherein a resolution of the processed image of the visual content is higher than a resolution of the visual content displayed in the given image.

In another aspect, an embodiment of the present disclosure provides a display apparatus comprising at least one image renderer, at least one camera and a processor configured to:

control the at least one camera to capture a given image of a real-world environment;

analyze the given image to identify at least one surface in the real-world environment that displays visual content;

compare the visual content displayed in the given image with a reference image of the visual content to determine a size, a position and an orientation of the at least one surface with respect to the at least one camera;

process the reference image of the visual content, based on the size, the position and the orientation of the at least one surface, to generate a processed image of the visual content;

replace the visual content displayed in the given image with the processed image of the visual content to generate a given mixed-reality image, wherein a resolution of the processed image of the visual content is higher than a resolution of the visual content displayed in the given image; and render, via the at least one image renderer, the given mixed-reality image.

In yet another aspect, an embodiment of the present disclosure provides a method of producing mixed-reality images for a display apparatus, the method comprising:

capturing, via at least one camera, a given image of a real-world environment;

analyzing the given image to identify at least one surface in the real-world environment that displays visual content;

comparing the visual content displayed in the given image with a reference image of the visual content to determine a size, a position and an orientation of the at least one surface with respect to the at least one camera;

processing the reference image of the visual content, based on the size, the position and the orientation of the at least one surface, to generate a processed image of the visual content; and replacing the visual content displayed in the given image with the processed image of the visual content to generate a given mixed-reality image, wherein a resolution of the processed image of the visual content is higher than a resolution of the visual content displayed in the given image.

Embodiments of the present disclosure substantially eliminate or at least partially address the aforementioned problems in the prior art, and provide mixed-reality images that represent visual content displayed in the real-world environment with high resolution.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 5B illustrates reference images of visual content, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an imaging system for producing mixed-reality images for a display apparatus, the imaging system comprising at least one camera and a processor communicably coupled to the at least one camera, wherein the processor is configured to:

> control the at least one camera to capture a given image of a real-world environment;
>
> analyze the given image to identify at least one surface in the real-world environment that displays visual content;
>
> compare the visual content displayed in the given image with a reference image of the visual content to determine a size, a position and an orientation of the at least one surface with respect to the at least one camera;
>
> process the reference image of the visual content, based on the size, the position and the orientation of the at least one surface, to generate a processed image of the visual content; and
>
> replace the visual content displayed in the given image with the processed image of the visual content to generate a given mixed-reality image, wherein a resolution of the processed image of the visual content is higher than a resolution of the visual content displayed in the given image.

In another aspect, an embodiment of the present disclosure provides a display apparatus comprising at least one image renderer, at least one camera and a processor configured to:

> control the at least one camera to capture a given image of a real-world environment;
>
> analyze the given image to identify at least one surface in the real-world environment that displays visual content;
>
> compare the visual content displayed in the given image with a reference image of the visual content to determine a size, a position and an orientation of the at least one surface with respect to the at least one camera;
>
> process the reference image of the visual content, based on the size, the position and the orientation of the at least one surface, to generate a processed image of the visual content;
>
> replace the visual content displayed in the given image with the processed image of the visual content to generate a given mixed-reality image, wherein a resolution of the processed image of the visual content is higher than a resolution of the visual content displayed in the given image; and
>
> render, via the at least one image renderer, the given mixed-reality image.

In yet another aspect, an embodiment of the present disclosure provides a method of producing mixed-reality images for a display apparatus, the method comprising:

> capturing, via at least one camera, a given image of a real-world environment;
>
> analyzing the given image to identify at least one surface in the real-world environment that displays visual content;
>
> comparing the visual content displayed in the given image with a reference image of the visual content to determine a size, a position and an orientation of the at least one surface with respect to the at least one camera;
>
> processing the reference image of the visual content, based on the size, the position and the orientation of the at least one surface, to generate a processed image of the visual content; and
>
> replacing the visual content displayed in the given image with the processed image of the visual content to generate a given mixed-reality image, wherein a resolution of the processed image of the visual content is higher than a resolution of the visual content displayed in the given image.

The present disclosure provides the aforementioned imaging system, display apparatus and method. The imaging system disclosed herein generates the mixed-reality images for the display apparatus, said mixed-reality images representing the visual content displayed within the real-world environment. The mixed-reality images are images that provide high-resolution optimal visual clarity of the visual content displayed on the at least one surface within the real-world environment. Such resolution and visual clarity in the mixed-reality images provides for a realistic representation of the visual content to the user of the display apparatus. Moreover, the imaging system accurately determines the position, the size and the orientation of the at least one surface displaying the visual content with respect to the at least one camera. In other words, the imaging system accurately localizes the at least one surface within the real-world environment. This allows for representing the visual content in the real-world environment with a correct perspective and high resolution. Therefore, the user of the display apparatus is provided with an immersive experience of the mixed-reality environment. The display apparatus disclosed herein is user friendly and robust. Moreover, the aforementioned method is seamless, accurate and efficiently provides the user with an enhanced representation of the visual content.

Throughout the present disclosure, the term "imaging system" refers to an equipment configured to produce mixed-reality images for the display apparatus. It will be appreciated that the imaging system produces the mixed-reality images in real time or near real time.

Throughout the present disclosure, the term "display apparatus" refers to a specialized equipment that is configured to present a simulated environment to a user when the display apparatus in operation is worn by the user on his/her head.

In such an instance, the display apparatus acts as a device (for example, such as a mixed-reality headset, a pair of mixed-reality glasses, and the like) that is operable to present a visual scene of a mixed-reality environment to the user. The display apparatus may also commonly be referred to as "head-mounted display apparatus".

Furthermore, the display apparatus renders the mixed-reality images to present mixed-reality environment to the user. The imaging system uses surface localization to generate the mixed-reality images that represent the visual content displayed on the at least one surface within the real-world environment. The visual content represented in the mixed-reality images has high resolution (optionally, near-human eye resolution). Therefore, the user views a realistic, high-resolution representation of visual content in the mixed-reality environment. The user is provided with an immersive experience of the mixed-reality environment, which improves the user's experience of using the display apparatus. It will be appreciated that the imaging system produces a plurality of mixed-reality images for the display apparatus. Said plurality of mixed-reality images collectively constitute the visual scene of the mixed-reality environment.

The imaging system is at least communicably coupled to the display apparatus. By way of such communicable coupling, the imaging system transmits the produced images to the display apparatus. In some implementations, the imaging system is integrated with the display apparatus. In such implementations, the imaging system is physically coupled to the display apparatus (for example, attached via mechanical and electrical connections to components of the display apparatus). In other implementations, the imaging system is implemented on a remote device that is separate from the display apparatus. In such implementations, the imaging system and the display apparatus are communicably coupled via a wired communication interface or a wireless communication interface. Optionally, the imaging system is mounted on the remote device. Examples of the remote device include, but are not limited to, a drone, a vehicle, and a robot. In such an instance, the remote device is physically positioned at a given real-world environment, whereas the user of the display apparatus is positioned away from (for example, at a distance from) the remote device.

Throughout the present disclosure the term "mixed-reality image" refers to an image that represents a combination of the real-world environment with a virtual environment (namely, a computer-generated environment). Optionally, the virtual environment is superposed on the real-world environment. Furthermore, the mixed-reality images represent a plurality of objects, wherein the plurality of objects comprise at least one real-world object and at least one virtual object. In an example, a mixed-reality image may represent a real-world object (for example, such as a table) and a virtual object (for example, such as a flower vase placed on top of the table).

Throughout the present disclosure, the term "camera" refers to an equipment that is operable to detect and process light from the real-world environment, so as to capture the given image of the real-world environment. Optionally, the at least one camera comprises a camera chip, wherein the light from the given real-world environment is directed by at least one optical element onto a photosensitive surface of the camera chip, thereby enabling the at least one camera to capture the given image of the given real-world environment.

It will be appreciated that the term "at least one camera" refers to "one camera" in some implementations, and "a plurality of cameras" in other implementations.

It will be appreciated that the at least one camera could be a two-dimensional camera or a three-dimensional camera. The two-dimensional camera allows for capturing two-dimensional images of the real-world environment whereas the three-dimensional camera allows for capturing three-dimensional images of the real-world environment. Beneficially, such three-dimensional images provide depth information of the real-world environment. Examples of the at least one camera will include, but are not limited to, a Red-Green-Blue (RGB) camera, a RGB-Depth (RGB-D) camera, a stereo camera, a plenoptic camera.

Throughout the present disclosure, the term "processor" refers to hardware, software, firmware or a combination of these. The processor controls operation of the imaging system. The processor is communicably coupled to the at least one camera wirelessly and/or in a wired manner. By way of such coupling, the processor obtains the given image from the at least one camera. The given image is then processed by the processor to produce the mixed-reality images. As an example, the imaging system may be mounted on a robot in a manner that the at least one camera is mounted on an outer surface of the robot, whereas the processor is mounted inside a body of the robot. In such an example, the processor may be wirelessly coupled to the at least one camera.

The processor controls the at least one camera to capture the given image of the real-world environment. Notably, the given image represents the real-world environment and the at least one real-world object present therein. The real-world environment is an indoor environment or an outdoor environment. Furthermore, the at least one camera provides a video see-through arrangement for the display apparatus. The video see-through arrangement allows the user to view the real-world environment whilst wearing the display apparatus.

Furthermore, the processor analyzes the given image to identify the at least one surface in the real-world environment that displays the visual content. Herein, the term "visual content" encompasses all types of content that can be viewed. Optionally, the visual content comprises at least one of: image content, graphical content, text content, video content. More optionally, the text content comprises at least one of: alphabetic content, numeric content, symbolic content. In an example, the real-world environment may be a living room of a house. The living room may comprise 6 surfaces, for example such as 4 walls, 1 ceiling and 1 floor. One wall of the living room may comprise a television, and another wall of the living room may comprise a painting. Therefore, out of the 6 surfaces in the living room, only two surfaces display visual content.

Optionally, the processor employs at least one image processing algorithm to identify the at least one surface present within the real-world environment. Optionally, in this regard, the at least one image processing algorithm comprises at least one of: an edge detection algorithm (for example, such as a canny edge detection algorithm), a vertex detection technique, a shape matching technique, an object recognition algorithm, a greyscale matching technique, a gradient matching technique, a marker recognition algorithm. It will be appreciated that generally, a given surface has a geometrical shape. Therefore, said at least one image processing algorithm can be utilized for identifying the at least one surface accurately.

Additionally or alternatively, optionally, when analyzing the given image, the processor is configured to identify the at least one surface based on a user's input regarding at least one of: a type of the real-world environment, user preferences. Notably, the user's input is indicative of at least one of: a type of the at least one surface, a number of the at least one surface, a shape of the at least one surface, a size of the at least one surface, a location of the at least one surface, an orientation of the at least one surface. Beneficially, the user's input is utilized by the imaging system for accurately identifying the at least one surface. The user's input provides the imaging system with features (namely, properties) associated with the at least one surface that are utilized by the imaging system to identify the at least one surface.

Optionally, the user provides his/her input via at least one user-interaction controller, the user-interaction controller being coupled in communication with the processor. Examples of the user-interaction controller include, but are not limited to, a joystick, a mouse, and a touchscreen-based device.

Optionally, the real-world environment is categorised into a plurality of types. Examples of the plurality of types include, but are not limited to, a residential environment (for example, such as an apartment, a bungalow, a castle, and the like), an educational environment (for example, such as a school, a college, and the like), a group assembly environment (for example, such as an exhibition hall, a road, a museum, a courtroom, a garden, and the like), an industrial environment (for example, such as a factory, a warehouse, a power plant, and the like), and an institutional environment (for example, such as a hospital, a reformatory facility, and the like). In an example, the user may provide a given input stating that a type of the real-world environment is a group assembly environment, and specifically, is a road. Roads generally have location signs indicating distance to various nearby landmarks/cities, geometrical road signs, advertisement hoardings, and so forth. Therefore, when analysing the given image, the processor may identify the aforementioned real-world objects present on the road as the at least one surface that represent the visual content. For example, the processor may analyse the given image to identify 2 location signs, 1 geometrical road sign, and 3 advertisement hoardings based on user's input.

Optionally, the user preferences pertain to at least one of: a number of the at least one surface to be identified, a size of the at least one surface to be identified, a material of the at least one surface to be identified, a location of the at least one surface to be identified. The processor identifies the at least one surface present in the real-world environment by obtaining and utilizing the user's preference with regard to the visual content. In an example, the real-world environment may be a football stadium comprising at least one surface (such as a score-board, a display-screen, a plurality of advertisement hoardings, and so forth). The user provides an input indicating his/her preference in viewing a visual content displayed on the score-board over a visual content displayed on the display-screen. The processor, based on the user's input of his/her preference in viewing the score-board, identifies the score-board as the at least one surface displaying the visual content.

Furthermore, the processor compares the visual content displayed in the given image with the reference image of the visual content to determine the size, the position and the orientation of the at least one surface with respect to the at least one camera. Notably, determining the size, the position and the orientation of the at least one surface enables the imaging system to produce a mixed-reality image of the visual content that represents the visual content displayed on the at least one surface in a realistic manner. Generally, the at least one camera has a known position and orientation in the real-world environment. The given image represents how the at least one surface and the visual content displayed on the at least one surface appears with respect to the camera. Therefore, the processor compares how different the visual content displayed in the given image appears with respect to the visual content in the reference image, in terms of size and pose (namely, position and orientation) of the visual content. Upon said comparison, the processor calculates the size, the position and the orientation of the at least one surface with respect to the at least one camera.

It will be appreciated that the display apparatus accurately localizes the at least one surface present within the real-world environment by determining the size, the position and the orientation of the at least one surface with respect to the at least one camera. Such localization enables the imaging system to produce the mixed-reality image in a manner that in the mixed-reality image, the visual content is represented with correct size and perspective.

Throughout the present disclosure, the term "reference image" refers to a high-resolution image of the visual content that is displayed on the at least one surface. The reference image of the visual content has a higher resolution as compared to a resolution of the visual content displayed in the given image. Furthermore, the reference image depicts the same visual content as the visual content represented in the given image, but optionally, with a different size and/or perspective than the given image. The reference image is a pre-stored image of the visual content. The processor retrieves the reference image from a storage device that stores the reference image.

Optionally, the reference image is retrieved from at least one of:
a data storage of a display device displaying the visual content,
a data repository that provides the visual content to the display device,
a cloud-based data repository.

Optionally, in this regard, the processor is communicably coupled to at least one of: the data storage, the data repository, the cloud-based data repository via a communication network. The communication network is an arrangement of interconnected programmable and/or non-programmable components that are configured to facilitate communication between the processor and at least one of: the data storage, the data repository and the cloud-based data repository. The communication network may provide wireless coupling and/or wired communication coupling.

In an example, the display device may be a smart television, wherein the smart television displays an advertisement that is stored in the data storage of the smart television. In such a case, the processor would retrieve a reference image of the advertisement from the data storage of the smart television.

In another example, the display device may be a projecting screen associated with a projector, wherein the projector receives a power-point presentation from the data repository and projects the power-point presentation onto the projecting screen. The processor would retrieve a reference image of the power-point presentation from the data repository.

In yet another example, the visual content may be a painting by a famous artist. In such a case, a reference image of the painting may be stored at a cloud-based data repository. The processor would retrieve the reference image of the painting from the cloud-based data repository.

Optionally, the processor employs at least one image processing algorithm to compare the visual content displayed in the given image with the reference image of the visual content. Examples of said at least one image processing algorithm will include, but are not limited to, Scale-invariant feature transform algorithm (SIFT), Speeded-Up Robust Feature algorithm (SURF), Oriented FAST and rotated BRIEF algorithm (ORB), Binary Robust Independent Elementary Features algorithm (BRIEF).

Optionally, the processor utilizes properties of a camera lens employed in the at least one camera when determining the size, the position and the orientation of the at least one surface with respect to the at least one camera. Notably, different type of camera lenses employed in the at least one camera have different optical properties. Examples of camera lens include, but are not limited to, biconvex lens, macro lens, telephoto lens, zoom lens, and wide angle lens.

Moreover, the processor processes the reference image of the visual content, based on the size, the position and the orientation of the at least one surface, to generate the processed image of the visual content. The reference image is processed (for example, by adjusting its size and/or perspective) in a manner that in the processed image, the size and pose of the visual content of the reference image matches the size and pose of visual content in given image. The visual content represented in the reference image is adjusted according to size, position and orientation of the at least one surface to yield the processed image. It will be appreciated that three attributes of the size, the position and the orientation of the at least one surface with respect to the at least one camera are taken into account whilst generating the processed image. Therefore, the processed image, and specifically, the visual content represented therein, conform to the size, the position and the orientation of the at least one surface.

Optionally, when generating the processed image of the visual content, the processor is configured to adjust at least one image parameter of the reference image, the at least one parameter comprising at least one of: a size, an aspect ratio, a colour, a tone, a sharpness, a stereoscopic effect.

It will be appreciated that the given image is a relatively low-resolution image representing the visual content from a perspective of the at least one camera. The reference image is a high-resolution image representing said visual content, but optionally, with a size and/or a perspective that is different from that of the visual content in the given image. The processed image is another high-resolution image representing said visual content, but with same size and perspective as that of the visual content in the given image. In other words, the processed image is a high-resolution image having the same size and pose as the visual content represented in the given image.

Optionally, the processor employs an image processing algorithm for processing the reference image to generate the processed image. Optionally, the image processing algorithm calculates a size difference and/or a perspective difference between the visual content in the reference image and the visual content in the given image by fitting a transformation matrix from a plurality of feature points in the reference image onto a plurality of corresponding feature points in the given image of the real-world environment to generate the processed image. The transformation matrix is further utilized to adjust the size and/or the perspective of the visual content in reference image to match the size and/or the perspective of the visual content in the given image, for generating the processed image of the visual content.

In an example, a given surface displaying the visual content may have a dimension of 10*10 square units and may be positioned directly in front of the at least one camera. The visual content may occupy a space of 4*4 square units on a center of the given surface. Therefore, the visual content is represented to have a straight pose in the given image. A reference image of the visual content displayed on the given surface may represent a different pose and a larger size of the visual content as compared to the given image. Therefore, the reference image would be processed to generate a processed image having a same pose and size of the visual content as represented in the given image, the processed image having a same resolution as the reference image. In particular, the size of the reference image would be reduced and the pose of the visual content in the reference image would be adjusted to conform to the pose of the visual content in the given image. As a result, the processed image has superior image quality, same size and same pose of the visual content as compared to the given image.

Optionally, when processing the reference image for generating the processed image, the processor utilizes the properties of the camera lens employed in the at least one camera.

The processor replaces the visual content displayed in the given image with the processed image of the visual content to generate the given mixed-reality image. The resolution of the processed image of the visual content is higher than the resolution of the visual content displayed in the given image. Notably, the given image represents the real-world environment, and specifically, the visual content displayed on the at least one surface of the real-world environment. When generating the given mixed-reality image, the processor only replaces the visual content of the given image with the processed image of the visual content, and a representation of a remaining region of the real-world environment in the given image remains unchanged. Optionally, the processor replaces the visual content by overlaying the processed image upon the visual content displayed in the given image.

It will be appreciated that as the processed image of the visual content has higher resolution than resolution of visual content displayed in the given image, the visual content displayed in the given mixed-reality image has better clarity and more visual detail as compared to the visual content displayed in the given image. The replacement of the given image with the processed image generates the given mixed-reality image representing real-world object(s) and virtual object(s). Optionally, upon said replacement, the visual content (having high resolution) of the processed image appears as a virtual object that is superposed on at least one real-world object (specifically, the at least one surface).

Optionally, a size of the visual content displayed in the processed image is larger than a size of the visual content displayed in the given image. Upon replacing the visual content displayed in the given image with the processed image of such visual content, the visual content in the mixed-reality image appears magnified in comparison to its size in the given image. It will be appreciated that such a size of the visual content in the processed image can be beneficially employed in cases where the size of the visual content in the given image is too small to be visually comprehensible.

For illustration purposes only, there will now be considered an example implementation wherein the real-world environment is a cricket-stadium. The processor controls the at least one camera to capture a given image of the cricket-stadium. The processor analyzes the given image to identify two surfaces in the cricket-stadium that display visual content. The two surfaces comprise a score-board and a display screen within the cricket stadium, wherein the score-board displays a visual content of a current score of an ongoing game and the display screen displays a visual content of a live telecast of the ongoing game. The processor compares said visual content displayed in the given image with reference images of the current score of the ongoing game and the live telecast of the ongoing game to determine a size, a position and an orientation of the two surfaces with respect to the at least one camera. The processor processes the reference images of the current score of the ongoing game and the live telecast of the ongoing game, based on the size, the position and the orientation of the two surfaces, to generate processed images of the visual content. The processor replaces the current score of the ongoing game and the live telecast of the ongoing game displayed in the given image with the processed images of the visual content to generate a given mixed-reality image. The given mixed-reality image represents the cricket stadium, wherein a resolution of the visual content in the given mixed-reality image is higher than a resolution of the visual content displayed in the given image.

Optionally, the at least one surface comprises a display screen of a display device present in the real-world environment, and wherein the processor is configured to obtain the reference image of the visual content from the display device or the data repository that provided the reference image of the visual content to the display device for display thereat. Throughout the present disclosure, the term "display device" refers to a specialized device that displays the visual content on its display screen. The display screen of the display device acts as the at least one surface that displays the visual content within the real-world environment. Examples of the display device include, but are not limited to, a smart television, a projection screen associated with a projector, a smart board, a tablet, a laptop and a mobile. Notably, the visual content to be displayed at the display screen of the display device is stored at the data storage of the display device or the data repository that provided the visual content to the display device. Therefore, said data storage or said data repository would have the reference image of the visual content stored thereon, and the processor retrieves the visual content as per requirement. The processor retrieves the reference image via the communication network.

Alternatively, optionally, the at least one surface comprises a display area that displays the visual content, wherein the processor is configured to obtain the reference image of the visual content from the cloud-based data repository. Examples of the display area include, but are not limited to, a bill board, an advertisement hoarding, a canvas, paper, a sticker, and a sign board. The display area is at least a portion of a given surface that has the visual content displayed thereon. Optionally, the display area displays analog visual content. Optionally, the processor queries the cloud-based data repository to retrieve the reference image of the visual content displayed in the display area.

Optionally, the processor is configured to retrieve, from the data repository, an image that matches the visual content displayed in the given image within a predefined similarity threshold, the retrieved image being used as the reference image of the visual content. Generally, the data repository stores a plurality of images. In such a case, the processor or a processing module of the data repository matches the visual content displayed in the given image with visual content displayed in the plurality of images, to identify the image that matches the visual content displayed in the given image from amongst the plurality of images. Since the identified image represents visual content that is considerably similar to the visual content of the given image, said identified image is retrieved by the processor to be used as the reference image of the visual content.

Optionally, an extent of similarity between an image stored at the data repository and the given image of the visual content is determined by calculating a similarity score (namely, a similarity value) for the image. In such a case, the image stored at the data repository is determined to be similar to the given image of the visual content when its similarity score lies within the predefined similarity threshold. Herein, the term "similarity score" refers to a measure of the extent of similarity between a given image stored at the data repository and the given image of the visual content. The term "predefined similarity threshold" refers to a well-defined range of similarity scores having a lower similarity limit and an upper similarity limit. When the similarity score of the image stored at the data repository lies within the predefined similarity threshold, the image is retrieved by the processor to be used as the reference image of the visual content.

Optionally, the predefined similarity threshold lies in a range of 60 percent similarity score to 100 percent similarity score. Optionally, in this regard, the lower similarity limit lies in a range of 60 percent similarity score to 95 percent similarity score, whilst the upper similarity limit lies in a range of 65 percent similarity score to 100 percent similarity score. For example, the predefined similarity threshold may be from 60, 65, 70, 75, 80, 85, 90, 95 percent similarity score up to 65, 70, 75, 80, 85, 90, 95, 100 percent similarity score.

Optionally, the processor is configured to: generate and store a three-dimensional model representing spatial geometry of the at least one surface in the real-world environment; and utilize the three-dimensional model to generate a sequence of mixed-reality images from a sequence of images captured by the at least one camera. Herein, the term "three-dimensional model" refers to a three-dimensional representation of the real-world environment that represents spatial geometry of the at least one surface in a realistic manner. Notably, the "spatial geometry of the at least one surface in the real-world environment" pertains to a position, a size, a structure and an orientation of the at least one surface in the real-world environment. Optionally, the three-dimensional model represents spatial geometry of the at least one real-world object.

It will be appreciated that the three-dimensional model is used by the processor to optimize processing required for generation of the sequence of mixed-reality images, since the spatial geometry of the at least one surface need not be computed separately for each image of the sequence of images captured by the at least one camera. In other words, the size, the position and the orientation of the at least one surface can be directly obtained from the three-dimensional model for generating the sequence of mixed-reality images from the sequence of images captured by the at least one camera in a time-efficient manner.

Optionally, when utilizing the three-dimensional model to generate the sequence of mixed-reality images, each image in the sequence of images captured by the at least one camera is analyzed by the processor to identify at least one surface in the real-world environment that displays visual content; for each image in the sequence of images captured by the at least one camera, a reference image of the visual content is retrieved; each reference image is processed, based on the spatial geometry of the at least one surface, to generate a corresponding processed image of the visual content; and each image of the sequence of mixed-reality images is generated by replacing the visual content displayed in its corresponding image in the sequence of images with a corresponding processed image of the visual content.

Optionally, the processor is configured to generate the three-dimensional model prior to capturing the given image of the real-world environment from which the given mixed-reality image is to be generated. The three-dimensional model represents the size, position and orientation of the real-world objects present within the real-world environment. In addition, the three-dimensional model depicts the real-world objects present within the real-world environment is realistically. Such representation of the real-world environment allows the processor to localize the at least one surface accurately. The processor localizes the at least one surface within the real-world environment based on the size, the position and the orientation of the at least one surface. Notably, localization of the at least one surface refers to determination of physical position and perspective of the at least one surface within the real-world environment.

Optionally, the processor is configured to:
obtain, from the display apparatus, information indicative of a gaze direction of a user;
determine, based on the gaze direction of the user, a region of interest in the real-world environment; and
select the at least one surface, from amongst a plurality of surfaces in the real-world environment that display respective visual content, based on the region of interest in the real-world environment.

The term "region of interest" refers to a region of the real-world environment whereat the gaze direction of the user is directed (namely, focused) when the user views a given image of the real-world environment. In other words, the region of interest is a fixation region within the real-world environment. The region of interest is a region of focus of the user's gaze within the real-world environment. When the gaze direction of the user is directed towards the region of interest, the region of interest is focused onto the fovea of the user's eyes, and is resolved to a much greater detail as compared to the remaining region(s) of the real-world environment.

Optionally, when determining the region of interest in the real-world environment, the processor is configured to map the gaze direction of the user to the given image of the real-world environment.

It will be appreciated that when the real-world environment comprises the plurality of surfaces that display respective visual content, the user's gaze may be directed towards only some of said plurality of surfaces. Optionally, in such a case, the processor is configured to select only those surface(s) that lie within the region of interest in the real-world environment, as the user's gaze is directed towards the region of interest. In other words, the processor is configured to select the at least one surface that lies within the region of interest from amongst the plurality of surfaces.

Optionally, upon selecting the at least one surface from amongst the plurality of surfaces, the processor is configured to replace visual content displayed on the selected at least one surface with a processed image of said visual content to generate the mixed-reality image. In the mixed-reality image, the visual content of the selected at least one surface that lies within the region of interest is replaced with the relatively higher resolution representation of the visual content in the processed image. This allows for representing, with high visual detail, the visual content displayed on the at least one surface at which the user is gazing. It will be appreciated that for other surface(s) that lie outside the region of interest, visual content displayed thereon may or may not be replaced when generating the mixed-reality image.

It will be appreciated that identifying the at least one surface within the region of interest reduces processing required for producing the given mixed-reality image. Notably, the given mixed-reality image is generated only for visual content displayed on the at least one surface within the region of interest. Therefore, a processing time, a processing cost, a processing complexity of the processor required for generating the given mixed-reality image is substantially reduced. In other words identifying the at least one surface that lie within the region of interest allows for an efficient processing for producing mixed-reality images.

Optionally, the display apparatus further comprises means for detecting the gaze direction of the user. Optionally, in this regard, the processor obtains the information indicative of the gaze direction of the user from the means for detecting the gaze direction.

Throughout the present disclosure, the term "means for detecting the gaze direction" refers to specialized equipment for detecting and/or following a direction of gaze of the user of the display apparatus, when said user views the real-world environment via the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of a projection of the real-world environment.

Optionally, the imaging system further comprising means for adjusting an orientation of the at least one camera, wherein the processor is configured to:
   obtain, from the display apparatus, information indicative of a head orientation of a user; and
   control the means for adjusting the orientation of the at least one camera, based on the head orientation of the user.

Throughout the present disclosure, the term "means for adjusting the orientation" of the at least one camera refers to specialized equipment for adjusting (namely, changing) the orientation of the at least one camera. The orientation of the at least one camera is optionally adjusted according to the head orientation of the user. Notably, a change in head orientation of the user results in a change of perspective from which the user views the visual content displayed on the at least one surface. As a result, the processor controls the means for adjusting the orientation of the at least one camera in a manner that the at least one camera is oriented to capture the given image of the real-world environment from a current perspective of the user.

In an example, the at least one camera may be employed in a grocery shop. A user wearing the display apparatus may enter the grocery shop and turn his/her head towards a left direction. In such instance, the at least one camera may have a first orientation in accordance with the leftward head orientation of the user. At the first orientation, the at least one camera captures items placed in a left region of the grocery shop (for example, such as a plurality of grocery racks placed within the grocery shop, an inventory store and an emergency exit from the door) within a given image of the grocery shop. When the user wearing the display apparatus turns his/her head to a direction that lies in front of the user, the head orientation of the user changes. As a result of such a change in head orientation, the orientation of the camera may be adjusted to a second orientation that is in accordance with current head orientation of the user. At the second orientation, the at least one camera captures items placed in a central region of the grocery shop (for example such as a billing counter, the plurality of grocery racks and an exit door from the grocery shop) within the given image of the grocery shop. It will be appreciated that the at least one camera, at different orientations, captures different perspective views of the real-world environment.

Optionally, the means for adjusting the orientation of the at least one camera is implemented as at least one actuator. The term "actuator" refers to equipment (for example, such as electrical components, mechanical components, magnetic components, polymeric components, and so forth) that is employable to adjust the orientation of the at least one camera. Furthermore, optionally, the at least one actuator is employed to tilt and/or rotate the at least one camera based upon change in the head orientation of the user. Optionally, the at least one actuator adjusts the orientation of the at least one camera using an actuation signal (for example, such as an electric current, hydraulic pressure, and the like). Optionally, the processor controls the at least one actuator by generating the actuation signal that indicates (namely, instructs) the at least one actuator to adjust the orientation of the at least one camera.

Optionally, the display apparatus further comprises a means for tracking the head orientation of the user. The means for tracking the head orientation generates the information indicative of the head orientation of the user. Herein, the "means for tracking the head orientation" refers to specialized equipment for detecting and/or following an orientation of the user's head, when the display apparatus in operation is worn by the user. Furthermore, the processor is at least communicably coupled to the means for tracking head orientation and obtains the information indicative of the head orientation therefrom.

The present disclosure also relates to the display apparatus comprising the at least one image renderer, the at least one camera and the processor. Various embodiments and variants disclosed above, with respect to the aforementioned first aspect, apply mutatis mutandis to the display apparatus.

Throughout the present disclosure the term "image renderer" refers to equipment that, in operation, renders the given mixed-reality image that is to be displayed to the user of the display apparatus. Optionally, a given image renderer is implemented as at least one display. Optionally, a given image renderer is implemented as at least one projector. In this regard, the given mixed-reality image is projected onto a projection screen or directly onto a retina of the user's eyes. The given mixed-reality image depicts the visual content displayed in the given image with a higher resolution than the given image, thereby providing an immersive and realistic experience of the mixed-reality environment to the user.

Optionally, the display apparatus comprises a Fovea Contingent Display (FCD) that, in operation, renders the given mixed-reality image. Optionally, in this regard, the FCD is implemented as a first display having a first display resolution and a second display having a second display resolution, the second display resolution being higher than the first display resolution. It will be appreciated that the FCD is designed to imitate a physiology of human vision. In other words, the given mixed-reality image would be rendered at different display resolutions, via the FCD, to provide a human eye-like viewing effect to the user. The FCD allows for increasing immersion and realism within the simulated environment.

Optionally, in the display apparatus, the at least one surface comprises a display screen of a display device present in the real-world environment, and wherein the processor is configured to obtain the reference image of the visual content from the display device or a data repository that provided the reference image of the visual content to the display device for display thereat.

Optionally, in the display apparatus, the processor is configured to retrieve, from a data repository, an image that matches the visual content displayed in the given image within a predefined similarity threshold, the retrieved image being used as the reference image of the visual content.

Optionally, in the display apparatus, the processor is configured to:
generate and store a three-dimensional model representing spatial geometry of the at least one surface in the real-world environment;
utilize the three-dimensional model to generate a sequence of mixed-reality images from a sequence of images captured by the at least one camera; and
render, via the at least one image renderer, the sequence of mixed-reality images.

Optionally, in the display apparatus, when analyzing the given image, the processor is configured to identify the at least one surface based on a user's input regarding at least one of: a type of the real-world environment, user preferences.

Optionally, the display apparatus further comprises means for detecting a gaze direction of a user, wherein the processor is configured to:
determine, based on the gaze direction of the user, a region of interest in the real-world environment; and
select the at least one surface, from amongst a plurality of surfaces in the real-world environment that display respective visual content, based on the region of interest in the real-world environment.

The present disclosure also relates to the method of producing mixed-reality images for the display apparatus. Various embodiments and variants disclosed above, with respect to the aforementioned first aspect and the aforementioned second aspect, apply mutatis mutandis to the method.

Optionally, in the method, the at least one surface comprises a display screen of a display device present in the real-world environment, and wherein the method further comprises obtaining the reference image of the visual content from the display device or a data repository that provided the reference image of the visual content to the display device for display thereat.

Optionally, the method further comprises retrieving, from a data repository, an image that matches the visual content displayed in the given image within a predefined similarity threshold, the retrieved image being used as the reference image of the visual content.

Optionally, the method further comprises:
generating and storing a three-dimensional model representing spatial geometry of the at least one surface in the real-world environment; and
utilizing the three-dimensional model to generate a sequence of mixed-reality images from a sequence of images captured by the at least one camera.

Optionally, in the method, the step of analyzing the given image comprises identifying the at least one surface based on a user's input regarding at least one of: a type of the real-world environment, user preferences.

Optionally, the method further comprises:
obtaining, from the display apparatus, information indicative of a gaze direction of a user;
determining, based on the gaze direction of the user, a region of interest in the real-world environment; and
selecting the at least one surface, from amongst a plurality of surfaces in the real-world environment that display respective visual content, based on the region of interest in the real-world environment.

Optionally, the method further comprises:
obtaining, from the display apparatus, information indicative of a head orientation of a user; and
adjusting an orientation of the at least one camera, based on the head orientation of the user.

DETAILED DESCRIPTION OF THE DRAWINGS

Figure 1:
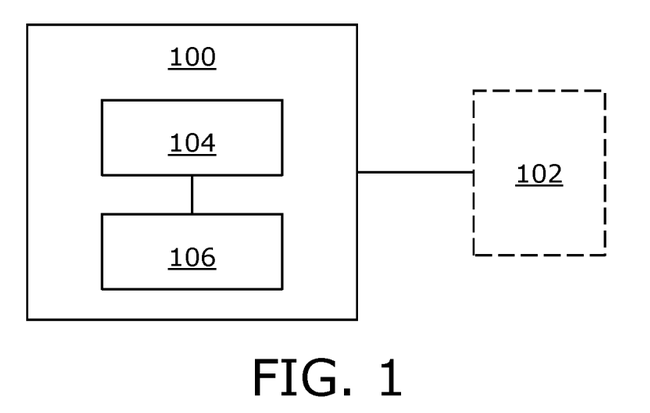
FIGS. 1 and 2 illustrate block diagrams of architectures of an imaging system for producing mixed-reality images for a display apparatus, in accordance with different embodiments of the present disclosure.

Referring to FIG. 1, illustrated is a block diagram of architecture of an imaging system 100 for producing mixed-reality images for a display apparatus 102, in accordance with an embodiment of the present disclosure. The imaging system 100 comprises at least one camera (depicted as a camera 104) and a processor 106 communicably coupled to the camera 104. The processor 106 is configured to:
control the camera 104 to capture a given image of a real-world environment;
analyze the given image to identify at least one surface in the real-world environment that displays visual content;

compare the visual content displayed in the given image with a reference image of the visual content to determine a size, a position and an orientation of the at least one surface with respect to the camera 104;

process the reference image of the visual content, based on the size, the position and the orientation of the at least one surface, to generate a processed image of the visual content; and replace the visual content displayed in the given image with the processed image of the visual content to generate a given mixed-reality image, wherein a resolution of the processed image of the visual content is higher than a resolution of the visual content displayed in the given image.

Figure 2:
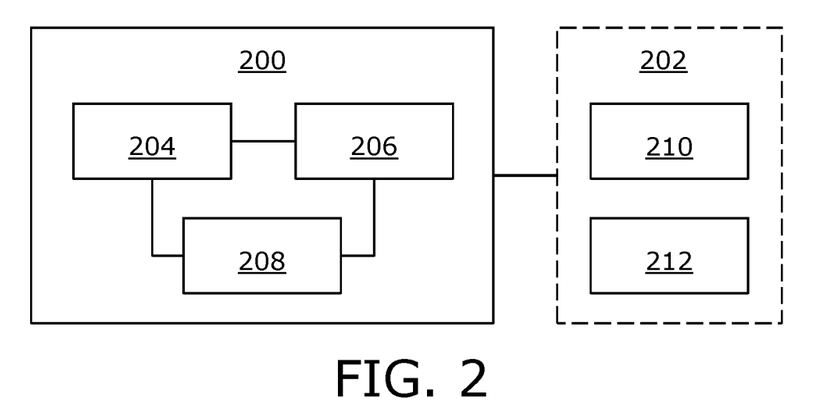

Referring to FIG. 2, illustrated is a block diagram of architecture of an imaging system 200 for producing mixed-reality images for a display apparatus 202, in accordance with another embodiment of the present disclosure. The imaging system 200 comprises at least one camera (depicted as a camera 204) and a processor 206 communicably coupled to the camera 204.

The imaging system 200 further comprises means 208 for adjusting an orientation of the camera 204, wherein the processor 206 is configured to:

obtain, from the display apparatus 202, information indicative of a head orientation of a user; and control the means 208 for adjusting the orientation of the camera 204, based on the head orientation of the user.

Moreover, the processor 206 is configured to:

obtain, from the display apparatus 202, information indicative of a gaze direction of the user;

determine, based on the gaze direction of the user, a region of interest in a real-world environment; and select at least one surface, from amongst a plurality of surfaces in the real-world environment that display respective visual content, based on the region of interest in the real-world environment.

The display apparatus 202 is shown to comprise a means 210 for tracking the head orientation of the user, said means 210 being configured to produce the information indicative of the head orientation of the user. The display apparatus 202 is also shown to comprise a means 212 for detecting the gaze direction of the user, said means 212 being configured to produce the information indicative of the gaze direction of the user.

It may be understood by a person skilled in the art that FIG. 1 and FIG. 2 include simplified architectures of the imaging systems 100 and 200, respectively, for sake of clarity, which should not unduly limit the scope of the claims herein. The person skilled in the art will recognize many variations, alternatives, and modifications of embodiments of the present disclosure.

Figure 3:
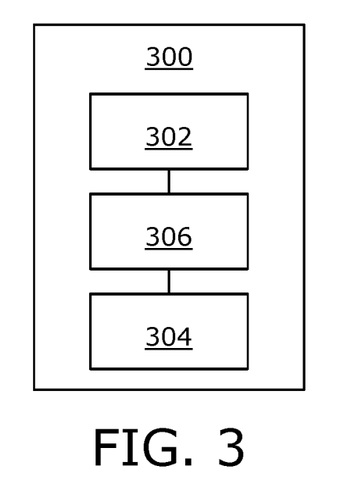
FIGS. 3 and 4 illustrate block diagrams of architectures of a display apparatus, in accordance with different embodiments of the present disclosure.

Referring to FIG. 3, illustrated is a block diagram of architecture of a display apparatus 300, in accordance with an embodiment of the present disclosure. The display apparatus 300 comprises at least one image renderer (depicted as an image renderer 302), at least one camera (depicted as a camera 304) and a processor 306. The processor 306 is configured to:

control the camera 304 to capture a given image of a real-world environment;

analyze the given image to identify at least one surface in the real-world environment that displays visual content;

compare the visual content displayed in the given image with a reference image of the visual content to determine a size, a position and an orientation of the at least one surface with respect to the camera 304;

process the reference image of the visual content, based on the size, the position and the orientation of the at least one surface, to generate a processed image of the visual content;

replace the visual content displayed in the given image with the processed image of the visual content to generate a given mixed-reality image, wherein a resolution of the processed image of the visual content is higher than a resolution of the visual content displayed in the given image; and render, via the image renderer 302, the given mixed-reality image.

Figure 4:
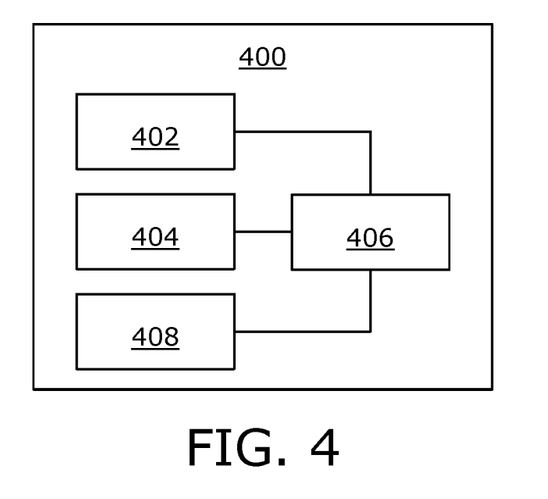

Referring to FIG. 4, illustrated is a block diagram of architecture of a display apparatus 400, in accordance with another embodiment of the present disclosure. The display apparatus 400 comprises at least one image renderer (depicted as an image renderer 402), at least one camera (depicted as a camera 404) and a processor 406. The display apparatus 400 further comprises means 408 for detecting a gaze direction of a user, wherein the processor 406 is configured to:

determine, based on the gaze direction of the user, a region of interest in a real-world environment; and select at least one surface, from amongst a plurality of surfaces in the real-world environment that display respective visual content, based on the region of interest in the real-world environment.

It may be understood by a person skilled in the art that FIG. 3 and FIG. 4 include simplified architectures of the display apparatuses 300 and 400, respectively, for sake of clarity, which should not unduly limit the scope of the claims herein. The person skilled in the art will recognize many variations, alternatives, and modifications of embodiments of the present disclosure.

Figure 5A:
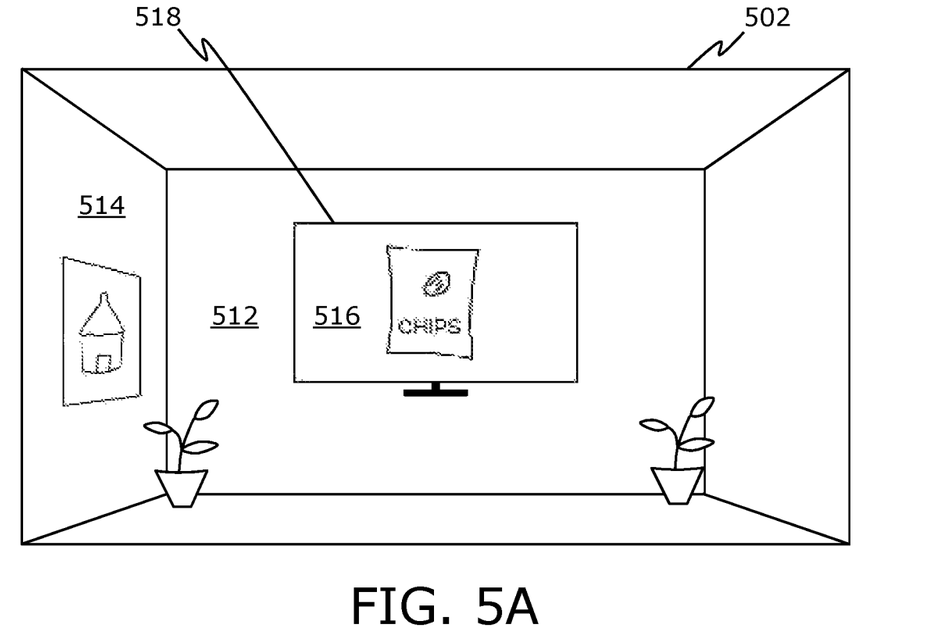
FIG. 5A illustrates a given image of a real-world environment.
Figure 5B:
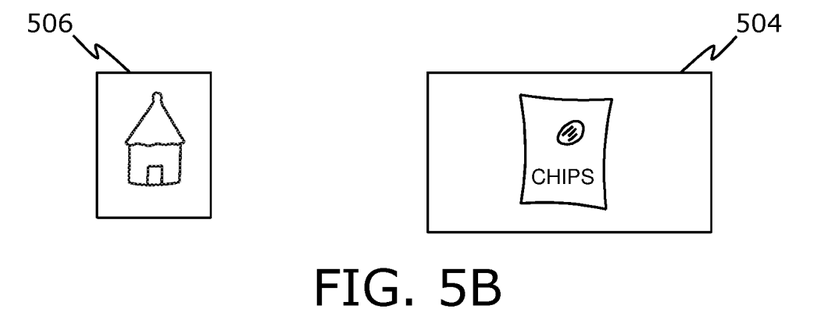
Figure 5C:
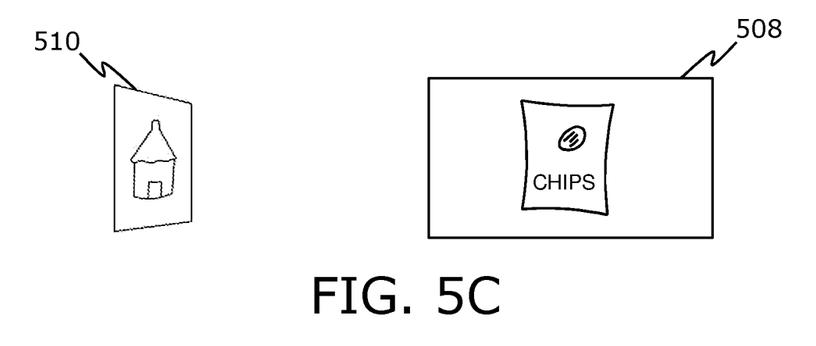
FIG. 5C illustrates processed images of the visual content, in accordance with an embodiment of the present disclosure.

Referring to FIGS. 5A, 5B and 5C, FIG. 5A illustrates a given image 502 of a real-world environment, FIG. 5B illustrates reference images 504 and 506 of visual content, while FIG. 5C illustrates processed images 508 and 510 of the visual content, in accordance with an embodiment of the present disclosure.

In FIG. 5A, the given image 502 represents an indoor real-world environment. The given image 502 is analysed to identify two surfaces 512 and 514 in the real-world environment that display visual content. Notably, the surface 512 comprises a display screen 516 of a display device 518 (depicted as a television) present in the real-world environment, whereas the surface 514 is a wall within the real-world environment. As shown, the surface 512 displays an advertisement for chips on the display screen 516. The surface 514 displays a painting of a house.

In FIG. 5B, there are shown two reference images 504 and 506 of the visual content displayed on the surfaces 512 and 514. The reference image 504 is a high-resolution image of the visual content displayed on the surface 512, while the reference image 506 is a high-resolution image of the visual content displayed on the surface 514. The visual content displayed in the given image 502 is compared with reference images 504 and 506 of the visual content to determine a size, a position and an orientation of the surfaces 512 and 514 with respect to at least one camera that is used to capture the given image 502.

In FIG. 5C, there are shown two processed images 508 and 510 of the visual content. These processed images 508 and 510 are generated upon processing the reference images 504 and 506, based on the size, the position and the orientation of the surfaces 512 and 514. To generate a given mixed-reality image, the visual content displayed in the given image 502 is replaced with the processed images 508 and 510. The resolution of the processed images 508 and 510 of the visual content is higher than a resolution of the visual content displayed in the given image 502.

It may be understood by a person skilled in the art that FIGS. 5A-5C include simplified exemplary illustrations of the given image 502, the reference images 504 and 506, and the processed images 508 and 510, for sake of clarity, which should not unduly limit the scope of the claims herein. The person skilled in the art will recognize many variations, alternatives, and modifications of embodiments of the present disclosure.

Figure 6:
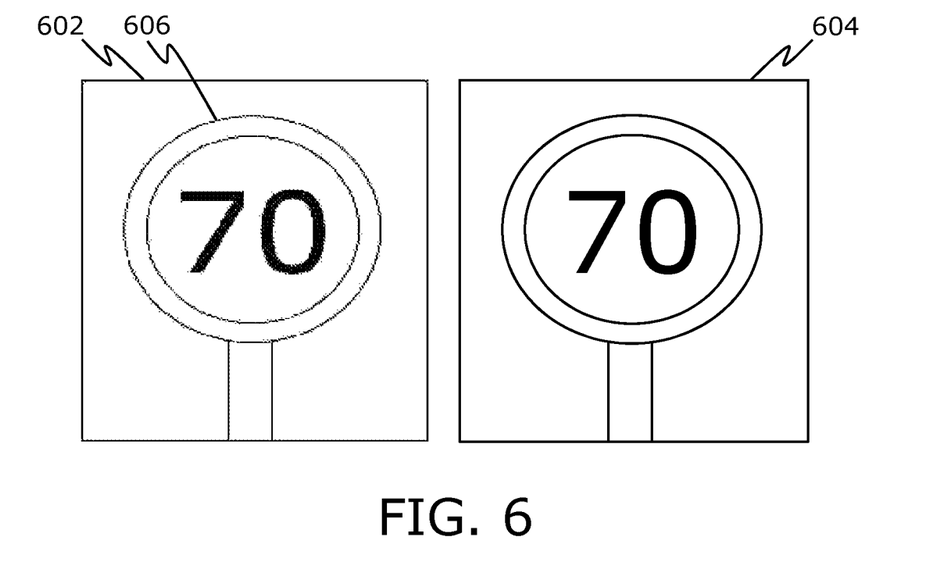
FIG. 6 illustrates a difference in resolution between visual content displayed in a given image of a real-world environment and a given mixed reality image, in accordance with an embodiment of the present disclosure.

Referring to FIG. 6, illustrated is a difference in resolution between visual content displayed in a given image 602 of a real-world environment and a given mixed-reality image 604, in accordance with an embodiment of the present disclosure. As shown, the given image 602 represents an outdoor real-world environment and comprises a surface 606 (depicted as a road sign) that displays visual content (depicted as a permissible speed limit of 70). Said visual content displayed in the given image 602 is compared with a reference image (not shown) of the visual content, and subsequently, the reference image is processed to generate a processed image (not shown) of the visual content. A resolution of the processed image of the visual content is higher than a resolution of the visual content displayed in the given image 602. The given mixed-reality image 604 is generated by replacing the visual content displayed in the given image 602 with the processed image of the visual content. As a result, the same visual content has a higher resolution in the given mixed-reality image 604 as compared to the given image 602.

FIG. 6 is merely a simplified example illustration of the given image 602 and the given mixed-reality image 604, for sake of clarity only, and should not unduly limit the scope of the claims herein. A person skilled in the art will recognize many variations, alternatives, and modifications of embodiments of the present disclosure.

Figure 7:
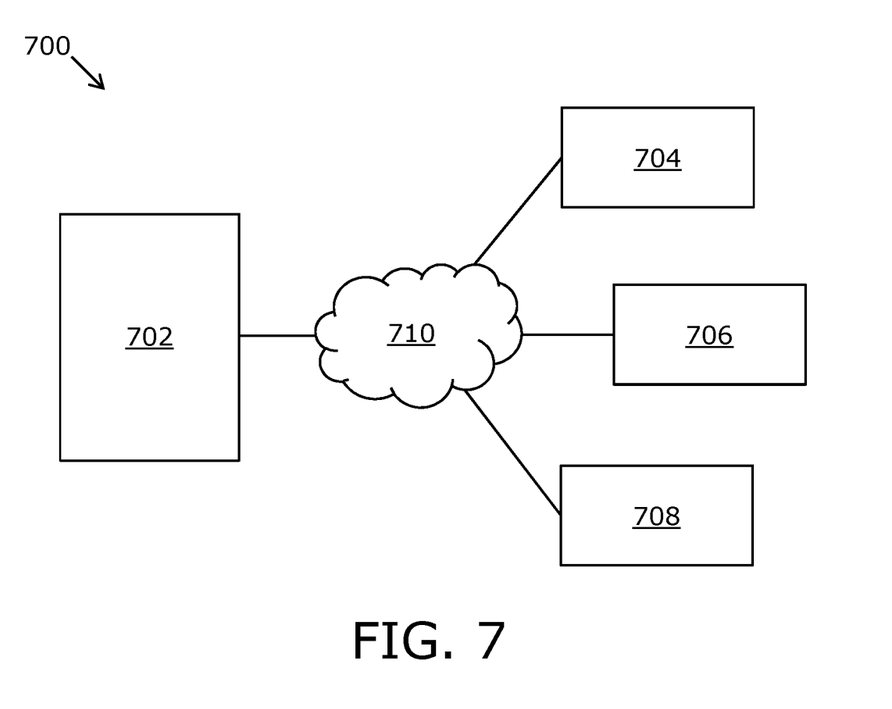
FIG. 7 is a schematic illustration of a network environment wherein an imaging system is implemented, in accordance with an embodiment of the present disclosure.

Referring to FIG. 7, illustrated is a schematic illustration of a network environment 700 wherein an imaging system 702 is implemented, in accordance with an embodiment of the present disclosure. As shown, the network environment 700 comprises the imaging system 702, a data storage 704 of a display device displaying visual content, a data repository 706 that provides the visual content to the display device, a cloud-based data repository 708, and a communication network 710. The imaging system 702 is coupled in communication with the data storage 704, the data repository 706, and the cloud-based data repository 708, via the communication network 710. The imaging system 702 is configured to obtain or retrieve a reference image of the visual content from the data storage 704, the data repository 706, or the cloud-based data repository 708.

It will be appreciated that FIG. 7 is merely an example, which should not unduly limit the scope of the claims herein. It is to be understood that the specific designation for the network environment 700 is provided as an example and is not to be construed as limiting the network environment 700 to specific numbers, types, or arrangements of components. A person skilled in the art will recognize many variations, alternatives, and modifications of embodiments of the present disclosure.

Figure 8:
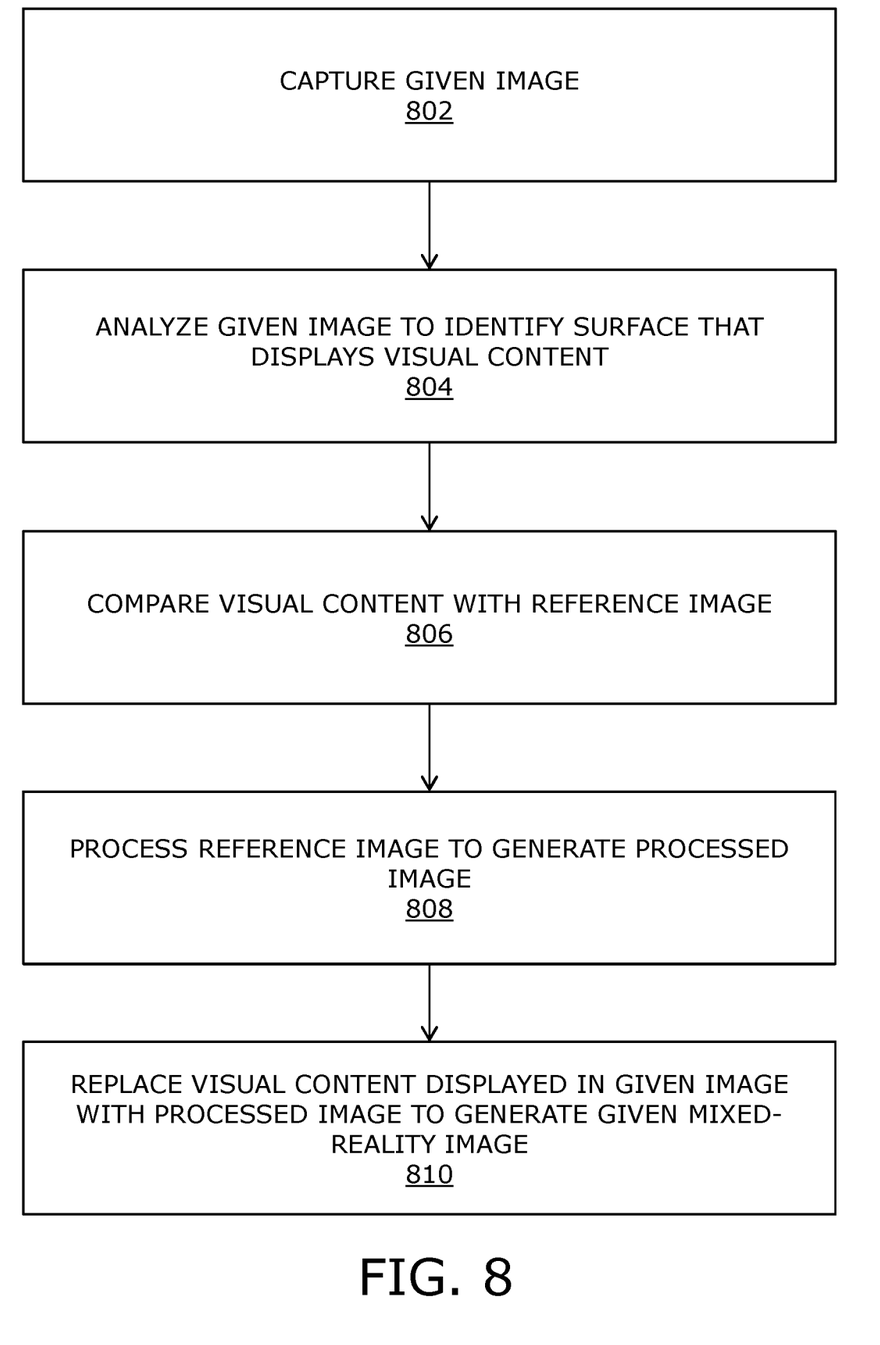
FIG. 8 illustrates steps of a method of producing mixed-reality images for a display apparatus, in accordance with an embodiment of the present disclosure.

Referring to FIG. 8, illustrated are steps of a method of producing mixed-reality images for a display apparatus, in accordance with an embodiment of the present disclosure. At step 802, a given image of a real-world environment is captured, via at least one camera. At step 804, the given image is analyzed to identify at least one surface in the real-world environment that displays visual content. At step 806, the visual content displayed in the given image is compared with a reference image of the visual content to determine a size, a position and an orientation of the at least one surface with respect to the at least one camera. At step 808, the reference image of the visual content is processed, based on the size, the position and the orientation of the at least one surface, to generate a processed image of the visual content. At step 810, the visual content displayed in the given image is replaced with the processed image of the visual content to generate a given mixed-reality image. A resolution of the processed image of the visual content is higher than a resolution of the visual content displayed in the given image.

The steps 802 to 810 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system for producing mixed-reality images for a display apparatus, the imaging system comprising at least one camera and a processor communicably coupled to the at least one camera, wherein the processor is configured to:
   control the at least one camera to capture a given image of a real-world environment;
   analyze the given image to identify at least one surface in the real-world environment that displays visual content;
   compare the visual content displayed in the given image with a reference image of the visual content to determine a size, a position and an orientation of the at least one surface with respect to the at least one camera;
   process the reference image of the visual content, based on the size, the position and the orientation of the at least one surface, to generate a processed image of the visual content; and
   replace the visual content displayed in the given image with the processed image of the visual content to generate a given mixed-reality image, wherein a resolution of the processed image of the visual content is higher than a resolution of the visual content displayed in the given image.

2. The imaging system of claim 1, wherein the at least one surface comprises a display screen of a display device present in the real-world environment, and wherein the processor is configured to obtain the reference image of the visual content from the display device or a data repository that provided the reference image of the visual content to the display device for display thereat.

3. The imaging system of claim 1, wherein the processor is configured to retrieve, from a data repository, an image that matches the visual content displayed in the given image within a predefined similarity threshold, the retrieved image being used as the reference image of the visual content.

4. The imaging system of claim 1, wherein the processor configured to:
generate and store a three-dimensional model representing spatial geometry of the at least one surface in the real-world environment; and
utilize the three-dimensional model to generate a sequence of mixed-reality images from a sequence of images captured by the at least one camera.

5. The imaging system of claim 1, wherein, when analyzing the given image, the processor is configured to identify the at least one surface based on a user's input regarding at least one of: a type of the real-world environment, user preferences.

6. The imaging system of claim 1, wherein the processor is configured to:
obtain, from the display apparatus, information indicative of a gaze direction of a user;
determine, based on the gaze direction of the user, a region of interest in the real-world environment; and
select the at least one surface, from amongst a plurality of surfaces in the real-world environment that display respective visual content, based on the region of interest in the real-world environment.

7. The imaging system of claim 1, further comprising means for adjusting an orientation of the at least one camera, wherein the processor is configured to:
obtain, from the display apparatus, information indicative of a head orientation of a user; and
control the means for adjusting the orientation of the at least one camera, based on the head orientation of the user.

8. A display apparatus comprising at least one image renderer, at least one camera and a processor configured to:
control the at least one camera to capture a given image of a real-world environment;
analyze the given image to identify at least one surface in the real-world environment that displays visual content;
compare the visual content displayed in the given image with a reference image of the visual content to determine a size, a position and an orientation of the at least one surface with respect to the at least one camera;
process the reference image of the visual content, based on the size, the position and the orientation of the at least one surface, to generate a processed image of the visual content;
replace the visual content displayed in the given image with the processed image of the visual content to generate a given mixed-reality image, wherein a resolution of the processed image of the visual content is higher than a resolution of the visual content displayed in the given image; and
render, via the at least one image renderer, the given mixed-reality image.

9. The display apparatus of claim 8, wherein the at least one surface comprises a display screen of a display device present in the real-world environment, and wherein the processor is configured to obtain the reference image of the visual content from the display device or a data repository that provided the reference image of the visual content to the display device for display thereat.

10. The display apparatus of claim 8, wherein the processor is configured to retrieve, from a data repository, an image that matches the visual content displayed in the given image within a predefined similarity threshold, the retrieved image being used as the reference image of the visual content.

11. The display apparatus of claim 8, wherein the processor is configured to:
generate and store a three-dimensional model representing spatial geometry of the at least one surface in the real-world environment;
utilize the three-dimensional model to generate a sequence of mixed-reality images from a sequence of images captured by the at least one camera; and
render, via the at least one image renderer, the sequence of mixed-reality images.

12. The display apparatus of claim 8, wherein, when analyzing the given image, the processor is configured to identify the at least one surface based on a user's input regarding at least one of: a type of the real-world environment, user preferences.

13. The display apparatus of claim 8, further comprising means for detecting a gaze direction of a user, wherein the processor is configured to:
determine, based on the gaze direction of the user, a region of interest in the real-world environment; and
select the at least one surface, from amongst a plurality of surfaces in the real-world environment that display respective visual content, based on the region of interest in the real-world environment.

14. A method of producing mixed-reality images for a display apparatus, the method comprising:
capturing, via at least one camera, a given image of a real-world environment;
analyzing the given image to identify at least one surface in the real-world environment that displays visual content;
comparing the visual content displayed in the given image with a reference image of the visual content to determine a size, a position and an orientation of the at least one surface with respect to the at least one camera;
processing the reference image of the visual content, based on the size, the position and the orientation of the at least one surface, to generate a processed image of the visual content; and
replacing the visual content displayed in the given image with the processed image of the visual content to generate a given mixed-reality image, wherein a resolution of the processed image of the visual content is higher than a resolution of the visual content displayed in the given image.

15. The method of claim 14, wherein the at least one surface comprises a display screen of a display device present in the real-world environment, and wherein the method further comprises obtaining the reference image of the visual content from the display device or a data repository that provided the reference image of the visual content to the display device for display thereat.

16. The method of claim 14, wherein the method further comprises retrieving, from a data repository, an image that matches the visual content displayed in the given image within a predefined similarity threshold, the retrieved image being used as the reference image of the visual content.

17. The method of claim 14, wherein the method further comprises:
generating and storing a three-dimensional model representing spatial geometry of the at least one surface in the real-world environment; and utilizing the three-dimensional model to generate a sequence of mixed-reality images from a sequence of images captured by the at least one camera.

18. The method of claim 14, wherein the step of analyzing the given image comprises identifying the at least one surface based on a user's input regarding at least one of: a type of the real-world environment, user preferences.

19. The method of claim 14, wherein the method further comprises:
- obtaining, from the display apparatus, information indicative of a gaze direction of a user;
- determining, based on the gaze direction of the user, a region of interest in the real-world environment; and
- selecting the at least one surface, from amongst a plurality of surfaces in the real-world environment that display respective visual content, based on the region of interest in the real-world environment.

20. The method of claim 14, wherein the method further comprises:
- obtaining, from the display apparatus, information indicative of a head orientation of a user; and
- adjusting an orientation of the at least one camera, based on the head orientation of the user.

* * * * *